J. J. & L. F. BURNER.
Fertilizer Distributer.

No. 235,738. Patented Dec. 21, 1880.

Witnesses:
William W. Dodge
Donn P. Twitchell

Inventor:
J. J. Burner
L. F. Burner
By their Attys
Dodge & Son

UNITED STATES PATENT OFFICE.

JOHN J. BURNER AND LEMUEL F. BURNER, OF STONEWALL, VIRGINIA.

FERTILIZER-DISTRIBUTER.

SPECIFICATION forming part of Letters Patent No. 235,738, dated December 21, 1880.

Application filed December 16, 1878.

*To all whom it may concern:*

Be it known that we, JOHN JACOB BURNER and LEMUEL FRAVEL BURNER, of Stonewall, in the county of Shenandoah and State of Virginia, have invented certain Improvements in Fertilizer-Distributers, of which the following is a specification.

Our invention relates to machines for sowing or distributing fertilizers; and it consists in a hopper provided with a sheet-metal bottom, which bottom is curved through a portion of its face to conform closely to the periphery of a distributing roll or rolls mounted upon a rotating horizontal shaft below said hopper; in a regulating-slide to control the amount of material fed, and in certain details of construction hereinafter explained.

Figure 1:
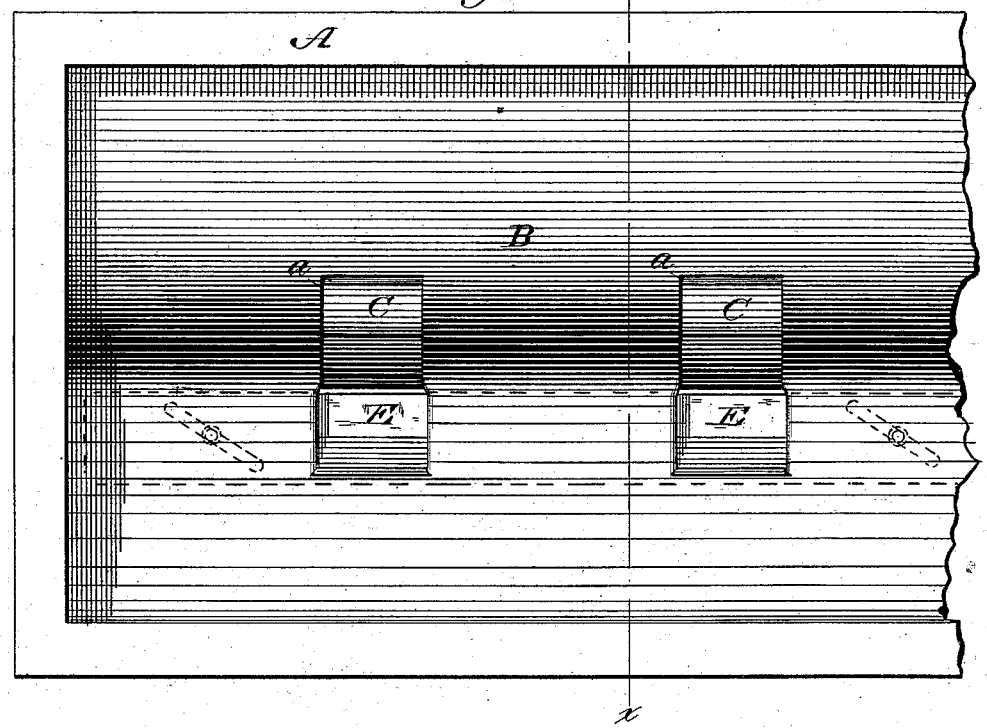
Figure 2:
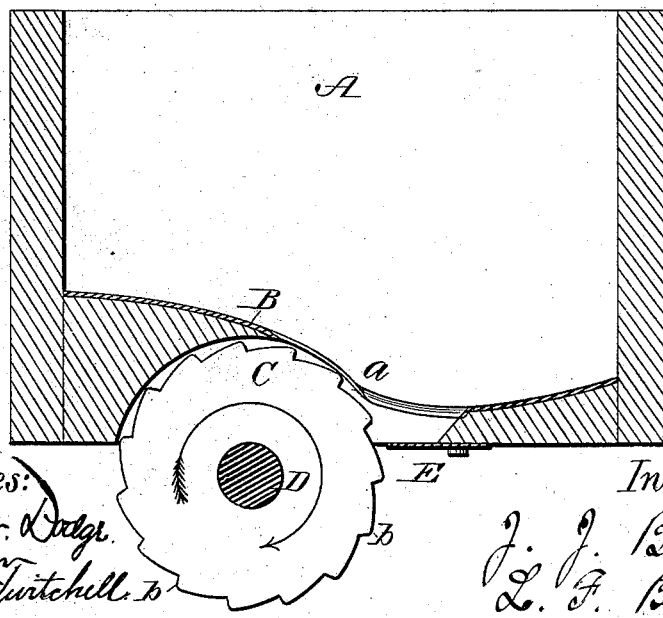

Figure 1 represents a top-plan view of our apparatus, and Fig. 2 a vertical cross-section of the same on the line $x\ x$ of Fig. 1, the driving mechanism being omitted from the drawing, as it constitutes no part of our invention.

The object of our invention is to provide a simple and efficient device for sowing or distributing guano, phosphates, and similar fertilizing materials, which shall require but a small amount of power to operate it, and shall effectually prevent the packing or clogging of the material in the hopper or its adherence to the feed-rolls. Machines for this purpose have been constructed in a variety of forms, some having a roll or series of rolls or arms mounted on a rotating shaft within the hopper, and others having the shaft and its rolls arranged below the hopper, with agitating-arms arranged to project from the rolls into the hopper, or mounted upon an independent shaft within the same, for the purpose of loosening the material and causing it to pass readily to the feeding-rolls.

When the rolls or agitating devices are placed within the hopper it is found that their action upon the fertilizing material, which is of a gummy, sticky consistency, packs or compresses the same into a solid mass and prevents frequently, rather than facilitates, the feeding or delivery of the material. So, too, when the roll or rolls are placed below the hopper and arranged in the usual manner, an equal portion of their face is exposed to the material each side of their vertical center; hence one-half of the exposed portion of the rolls works upward against and serves to compact the material in the hopper, greatly interfering with the operation of the machine. A further difficulty in the use of the machines of this class, as hitherto constructed, is found in the fact that the wooden bottom, which is universally used when the roll or rolls do not themselves constitute the bottom, prevents, by its thickness, the traveling of the roll close to the material in the hopper. To overcome these difficulties we construct our machine as represented in the accompanying drawings, in which—

A represents a box or hopper, of any suitable form and material, provided with a sheet-metal bottom, B; C, the feeding or distributing wheels mounted upon a longitudinal shaft, D, below the hopper, and E a regulating-slide to control the delivery of the material.

The hopper-bottom is provided with openings $a$ for the fertilizing material to pass through, the number and arrangement of the openings being varied according as the apparatus is designed for broadcast or drill sowing. Directly beneath each opening $a$ is mounted, upon the shaft D, a circular feed roll or wheel, C, as shown in Figs. 1 and 2. Commencing at the side wall of the hopper, at a point higher than the upper face of the feed-rolls C, the sheet-metal bottom B curves downward to a point vertically over or slightly beyond the center of the rolls, from which latter point it conforms closely in curvature to the periphery of the rolls for a suitable distance, as clearly shown in Fig. 2, and again curves or inclines slightly upward.

The curvature of the bottom B may, if desired, be varied, with the exception of that portion which conforms to the rolls, though the form shown is found to work well in practice.

The openings $a$ are extended some distance beyond the face of the feed-rolls, as shown, to furnish a large delivery-orifice, a regulating-slide, E, guided by pins passing through inclined slots, serving to cover more or less of said openings to govern the quantity of material delivered.

In practice, it is preferred to fill in the under side of the hopper bottom with wood or other suitable material, in order to preserve its form and prevent springing.

Constructed as above described, the operation of the machine is as follows: The hopper A being supplied with the material to be distributed, and having been previously attached to a grain-drill, seeder, or other machine with which it is to be used, and by or from which it is driven, the slide E is set to gage the quantity of material to be sown. Motion being imparted to the shaft D, the rolls C thereon are caused to rotate in the direction indicated by the arrow in Fig. 2, causing the ribs or shoulders b, with which they are provided, to act against the material which gravitates to the face of rolls, and to carry the same downward and discharge it from the machine past the slide E, either into the tube or tooth of the drill or directly on the ground, as may be found desirable.

It will be observed that by the peculiar manner of mounting our feed-rolls and curving the hopper-bottom the rolls act against the material in the direction in which it would naturally fall, instead of working upward against the same and against its weight, hence all tendency toward packing or compressing the material is avoided. The gravity of the material in the hopper, together with the jolting of the machine, serves to keep a supply thereof constantly in contact with the face of the feeding or distributing rolls, and consequently there is no necessity for the employment of agitating devices other than the rolls.

The feed-rolls being in contact with the material for a short distance only, and there being no other moving parts to the distributing mechanism, it will be seen that but very little power is required to operate the machine.

It will be particularly noted that the construction of our device is such that the material is not subjected to a forcing or squeezing action, but merely loosened at the bottom and caused to flow downward, there being in the device no converging or narrowing channels or passages through which the material is compelled to pass. This is of the utmost importance in the sowing of guano, which, from its peculiar nature, adheres with great tenacity when subjected to pressure, and which when dry becomes so hard that its removal is practically impossible.

The use of a sheet-metal bottom is important in this machine, as by its use the rolls C are permitted to travel almost on a line with upper face of the hopper-bottom while still being located below the hopper, the thickness of the sheet metal only intervening; and, further, it is highly important to provide a surface which will offer as little chance as possible for the adherence of the fertilizing material thereto.

Another difficulty experienced in the use of nearly all machines hitherto manufactured is that the guano or other material adheres to the feed-rolls. To obviate this difficulty and provide a feed wheel or roll which will remain clean and bright we form the same of brass. This, in practice, is found to render the use of brushes and scrapers unnecessary.

It is apparent that the form of the feeding or distributing rolls may be modified—for instance, they may be fluted or furnished with V-shaped or zigzag ribs.

Instead of the cut-off slide shown and described, other regulating devices may be employed.

Having thus described our invention, what we claim is—

1. In a guano-sower, the combination of a hopper having a thin sheet-metal bottom, and the external naked feed-wheel arranged immediately beneath said bottom, with its descending side only exposed beneath an opening therein.

2. The combination of the hopper having the sheet-metal bottom with an opening therein, the naked feed-wheel having one side exposed immediately beneath said opening, and the feed-regulating gate arranged opposite the breast of the wheel, as shown.

JOHN JACOB BURNER.
LEMUEL FRAVEL BURNER.

Witnesses as to the signature of John Jacob Burner:
P. T. DODGE,
W. W. DODGE.

Witnesses as to the signature of Lemuel Fravel Burner:
JOSEPH R. MILES,
JOHN GEARY.